UNITED STATES PATENT OFFICE.

WILHELM GAUS AND WILHELM WILD, OF LUDWIGSHAFEN-ON-THE-RHINE, GERMANY, ASSIGNOR TO ADOLF KUTTROFF, OF NEW YORK, N. Y.

PROCESS FOR MANUFACTURING NITROGEN-HYDROGEN MIXTURES.

1,390,200. Specification of Letters Patent. Patented Sept. 6, 1921.

No Drawing. Application filed July 9, 1920. Serial No. 395,123.

*To all whom it may concern:*

Be it known that we, WILHELM GAUS and WILHELM WILD, citizens of Germany, residing at Ludwigshafen-on-the-Rhine, Germany, have invented new and useful Improvements in Processes for Manufacturing Nitrogen-Hydrogen Mixtures, (for which we have filed applications in Germany, July 2, 1915, and Austria, May 6, 1916,) of which the following is a specification.

The large quantities of hydrogen necessary for the manufacture of ammonia by catalysis have hitherto been advantageously produced by the catalytic decomposition of water gas with steam and a subsequent removal of the carbon dioxid formed. The hydrogen thus produced was then mixed, in the desired proportion, with nitrogen, obtained for instance from air according to the Linde process, and the gas mixture was then introduced into the contact apparatus.

Now we have discovered a particularly simple and advantageous way to obtain the nitrogen-hydrogen mixture for the synthetical production of ammonia which consists in subjecting to the catalytic decomposition with steam a gas mixture containing nitrogen as well as carbon monoxid and preferably also hydrogen and having such a composition that after the reaction and the absorption of the carbon dioxid formed the desired nitrogen-hydrogen mixture for the manufacture of ammonia is directly obtained.

The gas mixture serving for the present process having the required composition, *i. e.* of about 1 part, by volume, of nitrogen to each three parts, by volume, of the sum of varying proportions of carbon monoxid and hydrogen and besides, if any, carbon dioxid and water vapor, can for instance be prepared in a water-gas producer by introducing thereinto the required quantity of air simultaneously with the steam. Thereby, in comparison with the usual manufacture of water-gas, the process is considerably simplified by the intercalation of heating periods being only necessary in far greater time intervals. For instance, the time of the gasification period can easily be extended to tenfold, or even more, the time that is usual for water-gas. The time of the gasification periods can be further extended if the steam, or the steam and the air, are preheated before introduction, which can be done by using, alone or with other sources of heat, the heat of the drawn-off gases. In fact under these conditions the intercalation of heating periods may even be entirely dispensed with. Another advantageous method for producing the gas mixture of the required composition to be subjected to the catalytic reaction consists in mixing together in a suitable proportion water-gas produced in the usual way with a mixed gas (Dowson gas) generated as usual.

The final composition of the gas mixture may vary within certain limits; most suitably the process is carried out in such a way that the end-gas contains about one part of nitrogen to every three parts of hydrogen.

The catalytic transformation of the carbon monoxid that is present in the mixed gas obtained is effected with particular advantage while using as a contact-mass iron oxid, prepared from precipitated iron hydroxid, with or without oxids of other metals, at temperatures of from 400 to 600 degrees centigrade. After the catalytic decomposition we remove the carbon dioxid, *e. g.* by washing with water under a pressure of 10, or more, atmospheres, and any traces of carbon monoxid still present are removed, for instance by washing with cuprous solutions, and other impurities, being eliminated (*e. g.* by the process described in the specification of U. S. Patent 1,133,087), a gas mixture suitable for the conversion into ammonia is directly obtained.

We claim:—

1. The process of manufacturing nitrogen-hydrogen mixtures suitable for the synthetic production of ammonia by subjecting to catalytic decomposition with steam a gas mixture containing nitrogen, carbon monoxid and hydrogen and having such a composition that by the subsequent removal of carbon dioxid and of impurities, a gas mixture of the composition required for the production of ammonia is obtained.

2. The process of manufacturing nitrogen-hydrogen mixtures suitable for the synthetic production of ammonia by subjecting to catalytic decomposition with steam a mixed gas generated in a water-gas producer by simultaneously employing steam and suitably controlled quantities of air, said mixed gas having such a composition that by the subsequent removal of carbon dioxid and of impurities, a gas mixture of the composition required for the production of ammonia is obtained.

3. The process of manufacturing nitrogen-hydrogen mixtures suitable for the synthetic production of ammonia by subjecting to catalytic decomposition with steam a mixed gas generated in a water-gas producer by simultaneously employing preheated steam and suitably controlled quantities of air, said mixed gas having such a composition that by the subsequent removal of carbon dioxid and of impurities, a gas mixture of the composition required for the production of ammonia is obtained.

In testimony whereof we have hereunto set our hands.

WILHELM GAUS.
WILHELM WILD.